US012196116B2

(12) United States Patent
Hatano

(10) Patent No.: US 12,196,116 B2
(45) Date of Patent: Jan. 14, 2025

(54) TURBOCHARGER

(71) Applicant: TOYOTA JIDOSHA KABUSHIKI KAISHA, Aichi-ken (JP)

(72) Inventor: Takato Hatano, Seto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/518,600

(22) Filed: Nov. 24, 2023

(65) Prior Publication Data

US 2024/0247604 A1 Jul. 25, 2024

(30) Foreign Application Priority Data

Jan. 24, 2023 (JP) ................................ 2023-008789

(51) Int. Cl.
*F01N 13/10* (2010.01)
*F02B 37/02* (2006.01)
*F02B 75/20* (2006.01)

(52) U.S. Cl.
CPC ............ *F01N 13/10* (2013.01); *F02B 37/025* (2013.01); *F02B 75/20* (2013.01)

(58) Field of Classification Search
CPC ........ F01N 13/10; F01N 13/107; F02B 37/02; F02B 37/025; F02B 37/18; F02B 75/20; F02C 6/12
See application file for complete search history.

(56) References Cited

U.S. PATENT DOCUMENTS

2016/0061149 A1* 3/2016 Moran .................. F02M 26/11 29/888.06
2017/0234211 A1 8/2017 Uehane et al.

FOREIGN PATENT DOCUMENTS

FR 2801072 A1 * 5/2001 ............ F01D 9/026
JP H07-279680 A 10/1995
JP 2017-145719 A 8/2017

OTHER PUBLICATIONS

Bryan Lehman et al., "The New 2.7L Turbo Engine from General Motors", 40. International Wiener Motorensymposium, May 16, 2019, 23pp.

* cited by examiner

*Primary Examiner* — Loren C Edwards
(74) *Attorney, Agent, or Firm* — HAUPTMAN HAM, LLP

(57) ABSTRACT

A turbocharger includes a turbine housing, and first, second, and third exhaust passages connected to the turbine housing. The first exhaust passage is connected to a first cylinder of cylinders of an internal combustion engine. An exhaust gas discharged from the first cylinder flows through the first exhaust passage. The second exhaust passage is connected to a second cylinder of the cylinders. An exhaust gas discharged from the second cylinder flows through the second exhaust passage. The third exhaust passage is connected to a third cylinder of the cylinders. An exhaust gas discharged from the third cylinder flows through the third exhaust passage. The exhaust gas flowing from the first exhaust passage and the exhaust gas flowing from the second exhaust passage join together inside the turbine housing.

3 Claims, 4 Drawing Sheets

TURBOCHARGER

CROSS-REFERENCE TO RELATED APPLICATION

This application is based upon and claims the benefit of priority of the prior Japanese Patent Application No. 2023-008789, filed on Jan. 24, 2023, the entire contents of which are incorporated herein by reference.

TECHNICAL FIELD

The present disclosure relates to a turbocharger.

BACKGROUND

A turbocharger that supercharges intake air introduced into an internal combustion engine is known (see, for example, Japanese Unexamined Patent Application Publication No. 7-279680).

A turbocharger is operated, by introducing exhaust gas from cylinders of the internal combustion engine to a turbine of the turbocharger. The exhaust gases discharged from the cylinders join together before being introduced into the turbine. Due to the collision of the exhaust gases at the joining portion, the loss of the exhaust gas (discharging loss) increases. Therefore, it is an object of the present disclosure to provide a turbocharger capable of suppressing the discharging loss.

SUMMARY

It is therefore an object of the present disclosure to provide a turbocharger capable of suppressing a discharging loss.

The above object is achieved by a turbocharger including: a turbine housing; and first, second, and third exhaust passages connected to the turbine housing, wherein the first exhaust passage is connected to a first cylinder of cylinders of an internal combustion engine, an exhaust gas discharged from the first cylinder flows through the first exhaust passage, the second exhaust passage is connected to a second cylinder of the cylinders, an exhaust gas discharged from the second cylinder flows through the second exhaust passage, the third exhaust passage is connected to a third cylinder of the cylinders, an exhaust gas discharged from the third cylinder flows through the third exhaust passage, the exhaust gas flowing from the first exhaust passage and the exhaust gas flowing from the second exhaust passage join together inside the turbine housing, and each of a distance from a shaft of the turbine to a connection position between the first exhaust passage and the turbine housing, and a distance from the shaft of the turbine to a connection position between the second exhaust passage and the turbine housing is greater than a distance from the shaft of the turbine to a connection position between the third exhaust passage and the turbine housing.

The cylinders may be arranged in a line, the first cylinder may be located at an end of the line, and the second cylinder may be located at the other end of the line.

The internal combustion engine may include the first cylinder, the second cylinder, and two of the third cylinders, the turbocharger may include two of the third exhaust passages, the first exhaust passage may be connected to the first cylinder and the turbine housing, the second exhaust passage may be connected to the second cylinder and the turbine housing, one of the third exhaust passages may be connected to one of the third cylinders, the other of the third exhaust passages may be connected to the other of the third cylinders, and the third exhaust passages may join together on an upstream side of a connection position to the turbine housing.

The turbine housing may include fourth, fifth, and sixth exhaust passages, the fourth exhaust passage may be connected to the first exhaust passage, the fifth exhaust passage may be connected to the second exhaust passage, the sixth exhaust passage may be connected to the third exhaust passage, the fourth exhaust passage and the fifth exhaust passage may join together, and an angle between the fourth exhaust passage and the fifth exhaust passage at a position where the fourth exhaust passage and the fifth exhaust passage join together other may be 90 degrees or less.

DETAILED DESCRIPTION

Figure 1:
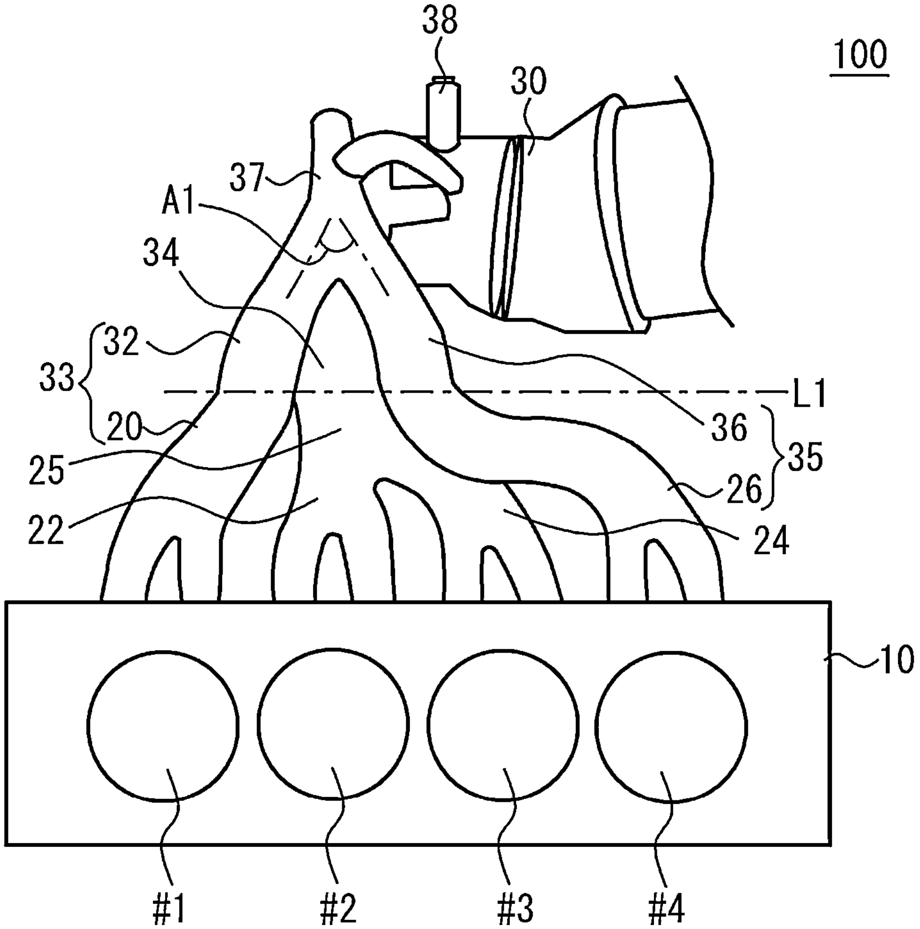
FIG. 1 is a schematic view illustrating a turbocharger according to a present an embodiment.

Hereinafter, a turbocharger of the present embodiment will be described with reference to the drawings. However, in the drawings, the dimensions, ratios, and the like of each part may not be illustrated so as to completely match the actual ones. Further, details may be omitted in some drawings.

FIG. 1 is a schematic view illustrating a turbocharger 100 according to a present embodiment. The turbocharger 100 is provided in an internal combustion engine 10. The internal combustion engine 10 is, for example, a four cylinder engine including four cylinders #1, #2, #3, and #4. The cylinders #1, #2, #3, and #4 are arranged in a line in this order. The cylinder #1 (the first cylinder) is located at an end of the line. The cylinder #4 (second cylinder) is located at the other end of the line. The cylinders #2 and #3 (third cylinders) are located between the cylinder #1 and the cylinder #4.

The turbocharger 100 includes exhaust passages 20, 22, 24, and 26 and a turbine housing 30. The exhaust passages 20, 22, 24, and 26 are provided in a cylinder head of the internal combustion engine 10.

A turbine is housed inside the turbine housing 30. The turbine housing 30 is provided with exhaust passages 32, 34, and 36 and a wastegate valve (WGV) 38.

In the cylinders of the internal combustion engine 10, an air-fuel mixture of fuel and air is combusted to generate exhaust gas. The exhaust gas flows from the cylinder of the internal combustion engine 10 into the turbine housing 30 of the turbocharger 100 through the exhaust passage. The exhaust gas is blown to the turbine, so the turbine rotates. A compressor (not illustrated) is coupled to the turbine and rotates with the turbine. When the turbocharger 100 is driven, air is supercharged. By supplying the high-pressure air to the internal combustion engine 10, the output of the internal combustion engine 10 increases.

A line L1 in FIG. 1 indicates connection positions between the exhaust passages 20, 22, 24, and 26 and the turbine housing 30.

An end of the exhaust passage 20 (first exhaust passage) is connected to exhaust ports of the cylinder #1 of the internal combustion engine 10. The other end of the exhaust passage 20 is connected to the turbine housing 30. The exhaust passage 20 communicates with an exhaust passage 32 (fourth exhaust passage) of the turbine housing 30. The exhaust passage 20 and the exhaust passage 32 form an exhaust passage 33.

An end of the exhaust passage 26 (second exhaust passage) is connected to exhaust ports of the cylinder #4 of the internal combustion engine 10. The other end of the exhaust passage 26 is connected to the turbine housing 30. The exhaust passage 26 communicates with an exhaust passage 36 (fifth exhaust passage) of the turbine housing 30. The exhaust passage 20 and the exhaust passage 36 form an exhaust passage 35.

The exhaust passage 32 and the exhaust passage 36 join together on the upstream side of the WGV 38 in the turbine housing 30 to form an exhaust passage 37. An angle between the exhaust passage 32 and the exhaust passage 36 at the joining position is A1.

An end of the exhaust passage 22 (third exhaust passage) is connected to exhaust ports of the cylinder #2 of the internal combustion engine 10. An end of the exhaust passage 24 (third exhaust passage) is connected to exhaust ports of the cylinder #3 of the internal combustion engine 10. The exhaust passage 22 and the exhaust passage 24 join together on the upstream side of the turbine housing 30 to form an exhaust passage 25. The exhaust passage 25 is connected to the turbine housing 30 and communicates with an exhaust passage 34 (sixth exhaust passage) of the turbine housing 30.

The exhaust passage extends in a scroll shape. A length of the scroll varies with its position. An outward scroll is longer than an inward scroll.

Figure 2:
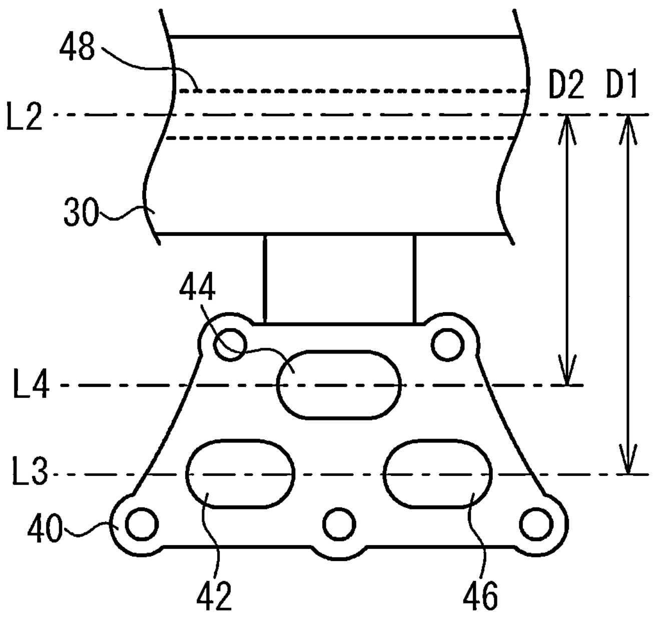
FIG. 2 is a view illustrating a flange portion of a turbine housing.

FIG. 2 is a view illustrating a front view of a flange portion 40 of the turbine housing 30. The exhaust passages 20, 25 and 26 of the cylinder head are connected to the flange portion 40. The flange portion 40 includes three holes 42, 44 and 46. The hole 42 communicates with the exhaust passage 32, and serves as a connecting portion between the exhaust passage 20 and the exhaust passage 32. The hole 44 communicates with the exhaust passage 34, and serves as a connecting portion between the exhaust passage 25 and the exhaust passage 34. The hole 46 communicates with the exhaust passage 36 and serves as a connecting portion between the exhaust passage 26 and the exhaust passage 36.

A dotted line in FIG. 2 represents a shaft 48 of the turbine. The turbine rotates about the shaft 48. A line L2 represents a center of the shaft 48. A line L3 represents a center (centroid) of holes 42 and 46. A line L4 represents a centroid of hole 44. A distance from the shaft 48 to the hole 42 is equal to a distance from the shaft 48 to the hole 46. Each of the distance from the shaft 48 to the hole 42 and the distance from the shaft 48 to the hole 46 is greater than a distance from the shaft 48 to the hole 44. A distance D1 from the center of the shaft 48 to the centroid of the holes 42 and 46 is greater than a distance D2 from the center of the shaft 48 to the centroid of the hole 44.

As illustrated in FIG. 2, each of the distance from the shaft 48 to the hole 42 and the distance from the shaft 48 to the hole 46 is greater than the distance from the shaft 48 to the hole 44. The exhaust passages 22, 24, 25 and 34 form inward scrolls. The exhaust passages 33 and 35 form outward scrolls. Therefore, each of the exhaust passages 33 and 36 is longer than each of the exhaust passages 22, 24 and 25.

The exhaust passage 33 and the exhaust passage 36 join to form the exhaust passage 35. Since the exhaust passage 33 and the exhaust passage 36 are long, the exhaust passage 33 and the exhaust passage 36 gradually approach each other until they join together. At the joining position, the angle A1 formed by the exhaust passage 33 and the exhaust passage 36 is small. The angle A1 is, for example, 90 degrees or less, 60 degrees or less, 45 degrees or less, or 30 degrees or less.

Comparative Example

Figure 3:
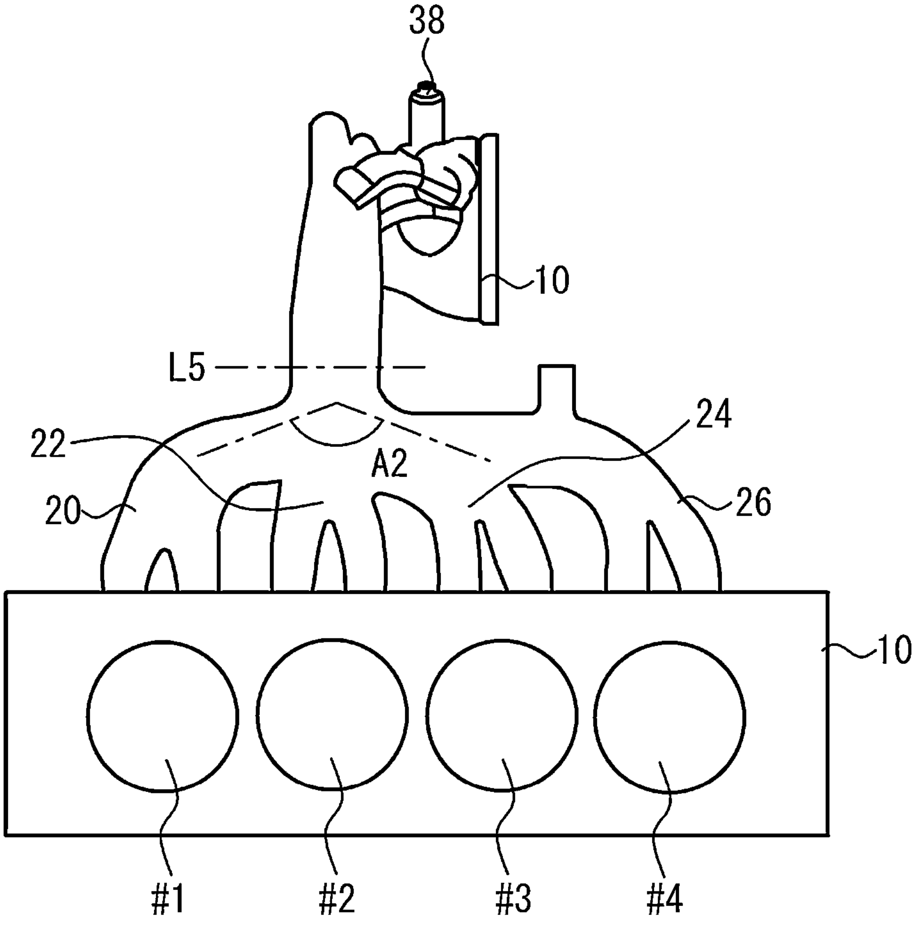
FIG. 3 is a schematic view illustrating a turbocharger according to a comparative example.

FIG. 3 is a schematic view illustrating a turbocharger according to a comparative example. A line L5 represents a connection position between the exhaust passage and the turbine housing 30. The exhaust passages 20, 22, 24, and 26 join together on the upstream side of a position where they are connected to the turbine housing 30, and are connected to the turbine housing 30 on the downstream side of the joining position.

The exhaust passage 20 is connected to the cylinder #1. The exhaust passage 26 is connected to the cylinder #4. The two exhaust passages 20 and 26 respectively connected to the cylinders at both ends join together before being connected to the turbine housing 30. Therefore, the exhaust passage 20 and the exhaust passage 26 face each other. An angle A2 between the exhaust passage 20 and the exhaust passage 26 is larger than the angle A1 in FIG. 1 and is close to 180 degrees. The exhaust gas flowing through the exhaust passage 20 and the exhaust gas flowing through the exhaust passage 26 collide with each other. The collision of the exhaust gas provides resistance to the discharge of the exhaust gas. As a result, the discharging loss increases.

Figure 4A:
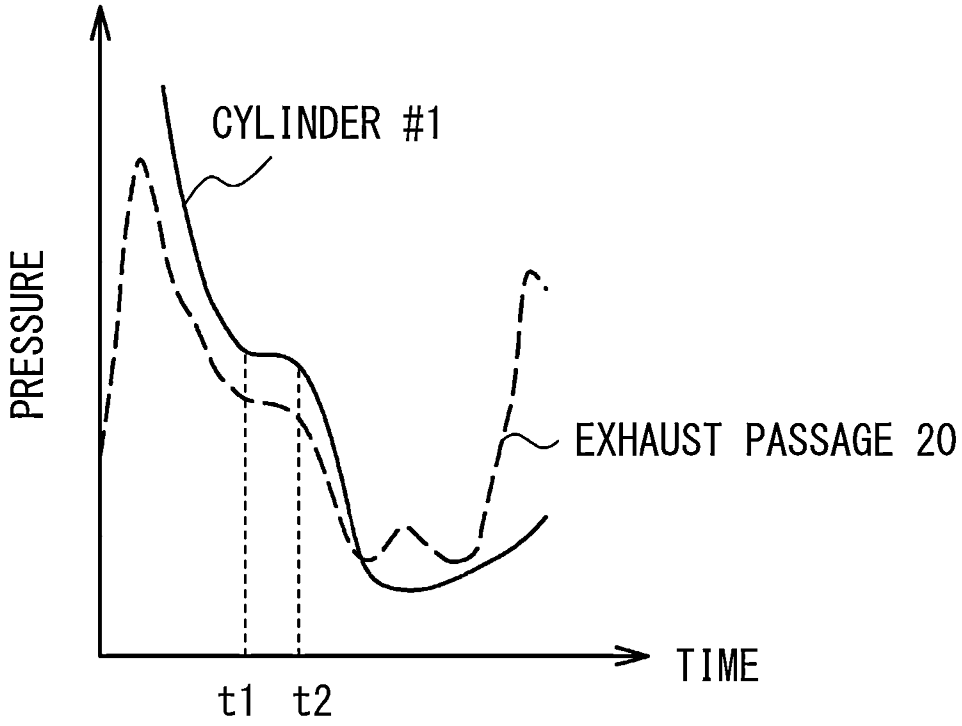
FIGS. 4A and 4B are views illustrating pressures.
Figure 4B:
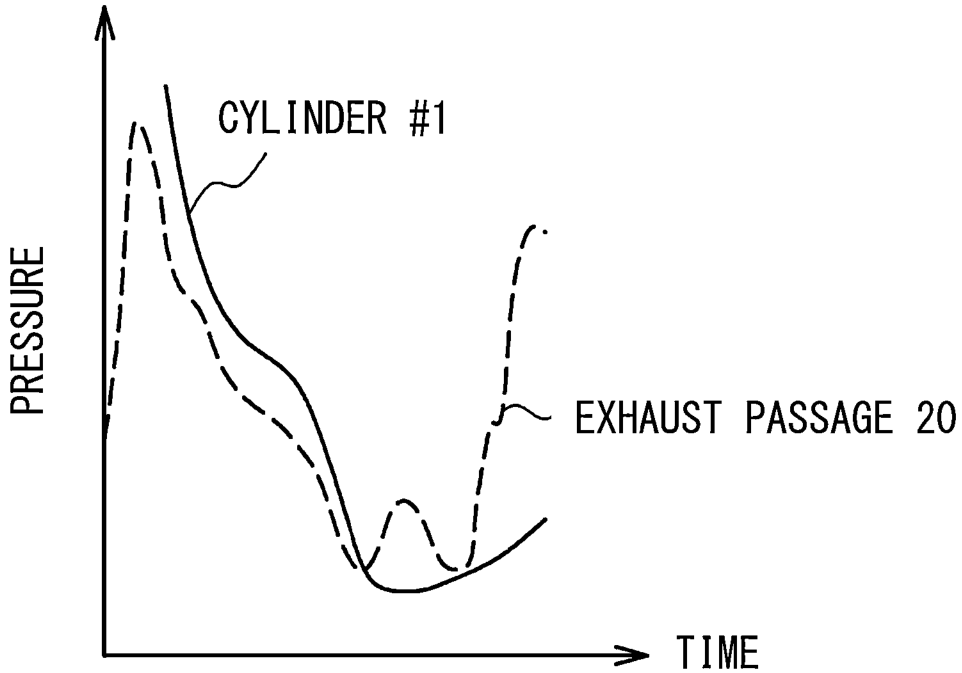

FIGS. 4A and 4B are view illustrating pressures. FIGS. 4A and 4B illustrate pressures in the cylinder #1 and the exhaust passage 20 in the exhaust stroke. A horizontal axis represents time. A vertical axis represents pressure. A solid line represents the pressure in the cylinder #1. A dotted line represents the pressure in the exhaust passage 20. FIG. 4A illustrates the comparative example. FIG. 4B illustrates the present embodiment.

As illustrated in FIGS. 4A and 4B, in the exhaust stroke, the pressures in the cylinder #1 and the exhaust passage 20 decrease. In the comparative example illustrated in FIG. 4A, the pressures do not easily decrease from time t1 to around time t2. This is because the collision of the exhaust gases makes it difficult for the exhaust gases to be discharged from the cylinder and the exhaust passage. In the present embodiment illustrated in FIG. 4B, the pressures do not stagnate but continues to decrease. This is because the exhaust gases do not easily collide with each other and are discharged.

According to the present embodiment, the exhaust passage 20 is connected to the cylinder #1 and the turbine housing 30, and communicates with the exhaust passage 32 through the hole 42. The exhaust passage 22 is connected to the cylinder #2 and the turbine housing 30. The exhaust passage 24 is connected to the cylinder #3 and the turbine housing 30. The exhaust passages 22 and 24 communicate with the exhaust passage 34 through the hole 44. The exhaust passage 26 is connected to the cylinder #4 and the turbine housing 30, and communicates with the exhaust passage 36 through the hole 46. As illustrated in FIG. 2, the distance D1 from the shaft 48 of the turbine to the holes 42 and 46 is greater than the distance D2 from the shaft 48 to the hole 44. The exhaust passages 20 and 32 and the exhaust passages 26 and 36 form the outward scrolls (the exhaust passages 33 and 35). The exhaust passages 22, 24 and 25 form the inward scrolls.

The outward scroll is longer than the inward scroll. The exhaust passage 33 and the exhaust passage 35 gradually approach each other and join to form the exhaust passage 37.

At the joining position, the angle A1 between the exhaust passage 33 and the exhaust passage 36 is small. The direction in which the exhaust gas flows through the exhaust passage 33 and the direction in which the exhaust gas flows through the exhaust passage 36 approach parallel to each other. Since the exhaust gases are less likely to collide with each other, it is possible to suppress the discharging loss.

The distance D1 from the shaft 48 of the turbine to the holes 42 and 46 may be 1.1 times or more, 1.2 times or more, 1.5 times or more, 1.8 times or more, 2 times or more, of the distance D2 from the shaft 48 to the hole 44.

The four cylinders of the internal combustion engine 10 are arranged in a line. The cylinder #1 is located at an end of the line. The cylinder #4 is located at the other end of the line. A distant between the cylinders #1 and #4 is longer than a distant between the adjacent cylinders. As in the comparative example illustrated in FIG. 3, when the exhaust passage 20 and the exhaust passage 26 are merged outside the turbine housing 30, the exhaust gases might collide with each other and the discharging loss might increase. In the present embodiment illustrated in FIG. 1, the exhaust passage 20 and the exhaust passage 26 do not join. The exhaust passage 32 communicating with the exhaust passage 20 and the exhaust passage 36 communicating with the exhaust passage 26 join together inside the turbine housing 30. As the exhaust direction approaches parallel, the discharging loss is suppressed.

The internal combustion engine 10 is, for example, a four cylinder engine. The exhaust passages 22 and 24 are connected to the two cylinders around the center. The exhaust passages 22 and 24 join together on the upstream side of a position at which they are connected to the turbine housing 30. Since the cylinders #2 and #3 are adjacent to each other, the angle formed by the exhaust passages 22 and 24 is small. The exhaust gases are less likely to collide with each other, and an increase in the discharging loss is suppressed. The cylinders #1 and #4 at both ends are separated from each other. The exhaust passages 20 and 26 do not join. Inside the turbine housing 30, the exhaust passages 32 and 36 join together. At the joining position, the flows of the exhaust gases discharged from the cylinders #1 and #4 approach parallel to each other. The discharging loss is suppressed.

The angle A1 between the exhaust passages 33 and 35 is, for example, 90 degrees or less, and may be 60 degrees or less, 45 degrees or less, 30 degrees or less, or 20 degrees or less. As the angle A1 becomes closer to 0 degrees, the flow of the exhaust gas becomes closer to equilibrium. The discharging loss is suppressed.

The ignition may be performed in the order of the cylinders #1, #3, #4, and #2, for example. In the cylinders #1 and #4, the ignition is not performed sequentially. The exhaust gas discharged from the cylinder #1 and the exhaust gas discharged from the cylinder #4 are unlikely to collide with each other. The discharging loss is suppressed.

The number of cylinders may be four or less or more. The cylinders are arranged in a line. The two exhaust passages 33 and 35 respectively connected to the cylinders at an end and the other end of the line, are the outward scrolls. Since the distance to the joining position increases, the angle A1 is reduced. The turbocharger 100 has two scrolls. The two scrolls may be aligned in the direction of the shaft 48 of the turbine or in the circumferential direction of the turbine. The scroll makes, for example, half a revolution of the turbine. The longer scroll is connected to the cylinders at both ends.

The internal combustion engine 10 may be, for example, a V-type eight cylinder engine other than the in-line multi-cylinder engine. Four cylinders of the eight cylinders form a bank. The other four cylinders form the other bank. The present embodiment may be applied to each of the two banks. It is possible to suppress discharging loss in each bank. A crankshaft of the V-type eight cylinder engine may be a flatplane or a crossplane. In the flatplane, the cylinders at both ends of the bank are not ignited sequentially. Since the exhaust gas is less likely to collide, it is possible to suppress the discharging loss.

Although some embodiments of the present disclosure have been described in detail, the present disclosure is not limited to the specific embodiments but may be varied or changed within the scope of the present disclosure as claimed.

What is claimed is:

1. A turbocharger comprising:

a turbine within a turbine housing; and first, second, and third exhaust passages connected to the turbine housing, wherein the first exhaust passage is connected to a first cylinder of cylinders of an internal combustion engine, an exhaust gas discharged from the first cylinder flows through the first exhaust passage, the second exhaust passage is connected to a second cylinder of the cylinders, an exhaust gas discharged from the second cylinder flows through the second exhaust passage, the third exhaust passage is connected to a third cylinder of the cylinders, an exhaust gas discharged from the third cylinder flows through the third exhaust passage, the exhaust gas flowing from the first exhaust passage and the exhaust gas flowing from the second exhaust passage join together inside the turbine housing, and each of a distance from a shaft of the turbine to a connection position between the first exhaust passage and the turbine housing, and a distance from the shaft of the turbine to a connection position between the second exhaust passage and the turbine housing is greater than a distance from the shaft of the turbine to a connection position between the third exhaust passage and the turbine housing, and wherein the internal combustion engine includes the first cylinder, the second cylinder, and two of the third cylinders, the turbocharger includes two of the third exhaust passages, the first exhaust passage is connected to the first cylinder and the turbine housing, the second exhaust passage is connected to the second cylinder and the turbine housing, one of the third exhaust passages is connected to one of the third cylinders, the other of the third exhaust passages is connected to the other of the third cylinders, and the third exhaust passages join together on an upstream side of a connection position between the third exhaust passage and the turbine housing.

2. The turbocharger according to claim 1, wherein the cylinders are arranged in a line, the first cylinder is located at an end of the line, and the second cylinder is located at an other end of the line.

3. The turbocharger according to claim 1, wherein the turbine housing includes fourth, fifth, and sixth exhaust passages, the fourth exhaust passage is connected to the first exhaust passage, the fifth exhaust passage is connected to the second exhaust passage, the sixth exhaust passage is connected to the third exhaust passage, the fourth exhaust passage and the fifth exhaust passage join together, and an angle between the fourth exhaust passage and the fifth exhaust passage at a position where the fourth exhaust passage and the fifth exhaust passage join together other is 90 degrees or less.

* * * * *